(12) United States Patent
Von Lehmann et al.

(10) Patent No.: US 11,994,199 B2
(45) Date of Patent: May 28, 2024

(54) HIGH REDUCTION RATIO TRANSMISSION

(71) Applicant: Maxon International AG, Sachseln (CH)

(72) Inventors: Ernst Von Lehmann, Glottertal (DE); Astrid Zimmermann, Sexau (DE)

(73) Assignee: MAXON INTERNATIONAL AG, Sachseln (CH)

( * ) Notice: Subject to any disclaimer, the term of this patent is extended or adjusted under 35 U.S.C. 154(b) by 0 days.

(21) Appl. No.: 17/633,714

(22) PCT Filed: Aug. 12, 2020

(86) PCT No.: PCT/EP2020/072556
§ 371 (c)(1),
(2) Date: Feb. 8, 2022

(87) PCT Pub. No.: WO2021/028451
PCT Pub. Date: Feb. 18, 2021

(65) Prior Publication Data
US 2022/0316573 A1    Oct. 6, 2022

(30) Foreign Application Priority Data
Aug. 13, 2019   (EP) .................................... 19191460

(51) Int. Cl.
*F16H 49/00* (2006.01)
*F16H 55/17* (2006.01)

(52) U.S. Cl.
CPC ........... *F16H 49/001* (2013.01); *F16H 55/17* (2013.01)

(58) Field of Classification Search
CPC .............................. F16H 49/001; F16H 55/17
See application file for complete search history.

(56) References Cited

U.S. PATENT DOCUMENTS

| 2,966,808 A | 1/1961 | Daniel |
| 6,202,509 B1 | 3/2001 | Dold |

(Continued)

FOREIGN PATENT DOCUMENTS

| CN | 1411540 A | 4/2003 |
| CN | 1439083 A | 8/2003 |

(Continued)

OTHER PUBLICATIONS

International Search Report (PCT/ISA/210) with translation and Written Opinion (PCT/ISA/237) dated Sep. 22, 2020, by the European Patent Office as the International Searching Authority for International Application No. PCT/EP2020/072556.

(Continued)

*Primary Examiner* — Terence Boes
(74) *Attorney, Agent, or Firm* — BUCHANAN INGERSOLL & ROONEY PC (57) ABSTRACT

The present disclosure relates to a transmission having a ring gear in which a flexible gearwheel is arranged, where the flexible gearwheel is connected to a wave generator and the wave generator deforms the flexible gearwheel such that it is in engagement in some regions with the ring gear. The flexible gearwheel includes at least two toothed segments which are connected to one another by way of spring segments and at least one of the toothed segments includes a recess in which a pin element is arranged.

19 Claims, 8 Drawing Sheets

(56) References Cited

U.S. PATENT DOCUMENTS

| | | | |
|---|---|---|---|
| 6,736,028 | B2 | 5/2004 | Ruttor et al. |
| 6,776,067 | B2 | 8/2004 | Boegelein et al. |
| 6,805,025 | B2 * | 10/2004 | Ruttor .................. F16H 49/001 |
| | | | 475/161 |
| 8,656,800 | B2 | 2/2014 | Cho et al. |
| 11,339,863 | B2 * | 5/2022 | Zimmermann ........... F16H 1/32 |
| 2003/0047025 | A1 * | 3/2003 | Ruttor .................. F16H 49/001 |
| | | | 74/640 |
| 2003/0089186 | A1 * | 5/2003 | Bogelein ............... F16H 49/001 |
| | | | 74/82 |
| 2003/0089194 | A1 * | 5/2003 | Ruttor ..................... F16H 25/06 |
| | | | 74/640 |
| 2013/0276575 | A1 | 10/2013 | Hoebel et al. |

FOREIGN PATENT DOCUMENTS

| | | |
|---|---|---|
| CN | 2886215 Y | 4/2007 |
| CN | 101328954 A | 12/2008 |
| CN | 101725690 A | 6/2010 |
| CN | 106737825 A | 5/2017 |
| CN | 107202152 A | 9/2017 |
| CN | 108953503 A | 12/2018 |
| CN | 109073061 A | 12/2018 |
| CN | 109578547 A | 4/2019 |
| CN | 109667909 A | 4/2019 |
| CN | 112855890 A | 5/2021 |
| DE | 10010680 A1 | 9/2001 |
| DE | 102014017530 A1 | 8/2015 |
| DE | 102016204784 A1 | 9/2017 |
| EP | 0974773 A2 | 1/2000 |
| GB | 305177 A | 1/1930 |
| JP | H10164797 A | 6/1998 |
| JP | 2009052580 A | 3/2009 |
| JP | 2018040460 A | 3/2018 |
| KR | 20180127885 A | 11/2018 |
| WO | 2016165684 A2 | 10/2016 |

OTHER PUBLICATIONS

Notification of the Third Office Action issued on Dec. 13, 2023, by the Chinese Patent Office in corresponding Chinese Patent Application No. 202080056569.3, and an English Translation of the Office Action. (13 pages).

Office Action issued on Mar. 26, 2024, 2024, by the Chinese Patent Office in corresponding Chinese Patent Application No. 202080056569. 3, and an English Translation of the Office Action. (7 pages).

Office Action (Notice of Reasons for Rejection) issued on Apr. 2, 2024, by the Japanese Patent Office in corresponding Japanese Patent Application No. 2022-505552, and an English Translation of the Office Action. (11 pages).

* cited by examiner

HIGH REDUCTION RATIO TRANSMISSION

The present invention relates to a transmission having a ring gear in which a flexible gearwheel is arranged, where the flexible gearwheel is connected to a wave generator and the wave generator deforms the flexible gearwheel such that it is in engagement in some regions with the ring gear, and where the flexible gearwheel comprises at least two toothed segments which are connected to one another by way of spring segments and at least one of the toothed segments comprises a recess in which a pin element is arranged.

Such transmissions are already known and are used, for example, in robotics. Use in the automotive sector is also known. For example, WO 2016/165684 A2 shows an adjustment mechanism for adjusting two components having a ring gear, a driver wheel, a wave generator, and an elastic spur wheel. The elastic spur wheel consists of several identically structured toothed elements. Each toothed element comprises a head region facing the ring gear and a foot region facing the wave generator. The head regions of the toothed elements are provided with a toothing that can come into contact with the ring gear. In addition, each toothed element has an outwardly open recess in its head segment which discontinues the toothing and is in contact with a driver pin of a driver wheel. Toothed elements disposed adjacent to one another are connected to one another by way of elastic connection elements. The wave generator is substantially elliptical and also makes the elastic spur gear assume an elliptical shape so that two oppositely disposed regions of the elastic spur wheel are in engagement with the ring gear.

Starting out from this prior art, an above-described transmission is now to be further improved such that sufficient elastic deformation of the flexible gearwheel can be obtained, in particular even with smaller diameters of the transmission, and a very short transmission with high torsional rigidity is provided.

It is provided for this purpose according to the invention that each of the spring segments has a middle plane which contains a central middle axis of the transmission and divides the respective spring segment into two regions of equal length, and each recess has a middle plane which includes the central middle axis of the transmission and divides the recess into two regions of equal size, and the middle plane of each spring segment is at a different distance from the middle plane of the recess disposed on each side of the middle plane of the spring segment, adjacent to the middle plane of the spring segment.

Such a gearwheel can be constructed to be very short and nevertheless have the desired high torsional rigidity. In addition, the configuration of the transmission according to the invention opens up the possibility of increasing the flexibility of the flexible gearwheel such that sufficient elastic deformations of the gearwheel can still be achieved, in particular with small diameters of the transmission.

It can also be provided that at least one of the toothed segments comprises a waisting in the radial direction of the flexible gearwheel and that the spring segments engage in this toothed segment in the region of the waisting. As a result, the spring segments can be configured to be larger or longer, respectively, whereby the flexibility of the flexible gearwheel is further increased, which is particularly advantageous with small transmission diameters.

The spring segments should advantageously be configured such that they exhibit elasticity in the radial direction and are rigid in the tangential direction. Deformation of the flexible gearwheel is then permitted only in the radial direction. In the tangential direction, forces can be transmitted from one toothed segment to the adjacent toothed segment without the flexible gearwheel deforming in the tangential direction. As a result, gear backlash between the transmission input and the transmission output is kept as small as possible.

A particularly simple configuration of the flexible gearwheel can be enabled in that the spring segments are formed integrally with the toothed segments.

The spring segments are advantageously configured as webs which connect adjacent toothed segments to one another. These webs are preferably formed to be arcuate and ensure the desired elasticity in the radial direction, whereas they are rigid in the tangential direction. The webs are preferably arranged at a distance from the head region of the toothed segments where they enter into engagement with the ring gear and at a distance from the foot regions where the toothed segments come into contact with the wave generator. The arcuate webs preferably extend along a circular line, the center of which is disposed in the region or on the central middle axis of the transmission. As an alternative, webs designed to be linear are also possible.

In order to further increase the flexibility, it can be provided that the flexible gearwheel comprises at least one first toothed segment that is provided with a recess, and at least one second toothed segment that comprises no recess. The toothed segments provided with a waisting preferably comprises no recess. As a result, the spring segments extending between the toothed segments can be configured to be longer and a good combination of flexibility and strength of the toothed segments is obtained. The toothing force of the at least one second toothed segment is transmitted to the at least one first toothed segment by way of the spring segments.

In yet another embodiment, the spring segments engage in the at least one first toothed segment at the level of the recesses in the at least one first toothed segment. This results in good transmission of the toothing forces of the at least one second toothed segment to the at least one first toothed segment.

In order to obtain sufficient flexibility also with the toothed segments provided with a recess which are significantly wider in the middle region than the toothed segments provided with the waisting, it can be provided that the spring segments have a relief cut in the region where they are in contact with the at least one first toothed segment.

Furthermore, it can be provided that a plurality of toothed segments, in particular at least four toothed segments are provided. In the case of a flexible gearwheel with four or more toothed segments, which are accordingly connected to one another by four or more spring segments, sufficient flexibility of the toothed wheel can be ensured in a simple manner.

A good compromise between the flexibility of the flexible gearwheel and sufficient strength can be made possible in that half of the toothed segments comprise a recess. Therefore, the same number of first and second toothed segments are present. The second toothed segments, which do not comprise any recess, transmit the toothing forces via the spring elements to the first toothed segments with a recess. As a result, the flexible connections can be configured to be larger, whereby the flexibility of the flexible gearwheel is increased and sufficient elastic deformations can still be ensured even with a small diameter of the transmission.

It can be provided in yet another embodiment that the recess is arranged in the first toothed segments in the interior of the respective toothed segment. The recess in these toothed segments therefore has a closed circumferential contour along which the pin element rolls. As a result, contact between the pin element and the recess in the respective toothed segments is never discontinued, which increases the running smoothness of the transmission. The recesses are advantageously configured to be substantially elliptical. Furthermore, the toothed segments can then have end-to-end toothing in a head region facing the ring gear.

According to yet another embodiment, each of the toothed segments can be supported on the wave generator at two support points. A foot region facing the wave generator is then configured to be concave so that it only comes into contact with the wave generator at two points. The angle between the two support points is preferably approximately 170°. The alignment of the toothed segments normal to the outer contour of the wave generator can thus be improved.

It is provided in yet another embodiment that the wave generator comprises at least one cam which is in contact with the flexible gearwheel, and the cam is configured such that the toothed segments are deformed in the region where they are in engagement with the ring gear such that they form a section of an imaginary gearwheel having a constant radius and rotating about an axis that is arranged at a defined distance from the central middle axis of the transmission. The section of the imaginary gearwheel with a constant radius comprises an angular range of preferably 45°-100° or 55°-85° and in particular 60°-80°. The constant radius of the imaginary gearwheel has a length ratio to the radius of the ring gear of preferably 75-99%, or 82-97% and in particular 85-95%. As a result, the number of toothed segments can be independent of the number of teeth of the entire flexible gearwheel. The number of teeth of the gearwheel is therefore no integer multiple of the number of toothed segments. As a result, the arrangement of the teeth on the toothed segments does not necessarily have to be uniform. The configuration of the wave generator described above ensures that every tooth on the toothed segments has the same shape. The only boundary condition there is that the distance between the two outer teeth, which are located on adjacent tooth segments, be an integer multiple of tooth width S within this region. Tooth width S there means twice the distance between two adjacent teeth. The wave generator preferably comprises two respective cams which are arranged on the circumference of the wave generator such that the wave generator comprises a section with a constant radius in the region where the flexible gearwheel comes into contact with the ring gear. The section with a constant radius comprises an angular range of preferably 45°-100° or 55°-85° and in particular 60°-80°. Alternatively, the wave generator can also comprise an elliptical section profile in the region where the flexible gearwheel comes into contact with the ring gear. In the aforementioned configurations, the teeth of the flexible gearwheel can preferably be adapted accordingly and can have at least two different tooth shapes. Configurations of the wave generator with, for example, three, four, or more cams are also possible. The cams are preferably arranged symmetrically around the circumference of the wave generator.

It can be provided in a simple configuration that the pin elements are configured as bolts that are connected to an output shaft. As a result, the motion of the flexible gearwheel is transferred via the bolts to a uniform rotary motion of the output.

A sleeve is there preferably arranged on each bolt so that a sliding bearing with the associated advantages is formed. Alternatively, an elastic sleeve or elastic O-rings can also be arranged on each bolt. In this configuration variant, the associated recesses can alternatively be configured having a round cross section.

In an alternative configuration, the pin elements are formed to be stationary and the ring gear to be rotatable. The ring gear is there driven by the engagement of the flexible gearwheel and accordingly serves as an output element in this configuration variant.

The invention shall be described below in more detail using the figures, where.

It applies to the following explanations that like components are designated with like reference characters. Where a figure contains reference characters which are not explained in more detail in the associated figure description, then reference is made to preceding or subsequent figure descriptions.

Figure 1:
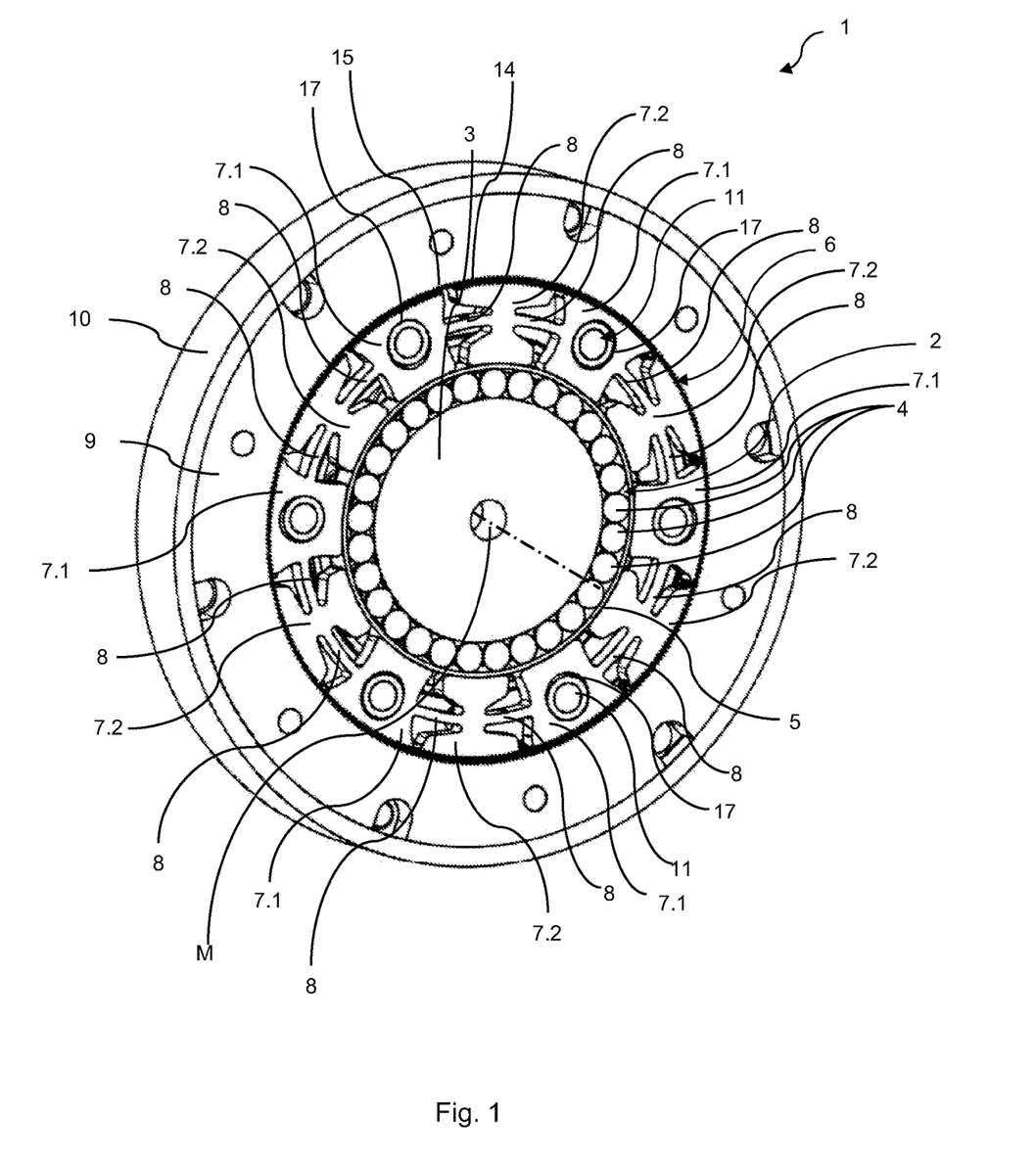
FIG. 1: shows a perspective view of a transmission according to the invention.

An embodiment of a transmission 1 of the present invention is shown in FIG. 1. Transmission 1 comprises a housing 10 in which a wave generator 2, a flexible gearwheel 6, a stationary ring gear 9, and a pin element 11 are arranged. The cover of housing 10 has been removed in order to allow for a view into the interior of the transmission. Transmission 1 is substantially disk-shaped with a central middle axis M.

Wave generator 2 comprises a base body 3 which has an approximately elliptical cross section. As a result of the approximately elliptical cross section, base body 3 has two sections with elevations. The elevations on base body 3 create cams on wave generator 2. Flexible gearwheel 6 is made to contact ring gear 9 by the cams. Base body 3 can comprise a section having a constant radius, where center $M_S$ of this constant radius is offset from central middle axis M by distance e. Rolling elements 4, which are surrounded by a deformable sleeve 5, are arranged on base body 3. Flexible gearwheel 6 is arranged on wave generator 2. Flexible gearwheel 6 is therefore in contact with base body 3 by way of deformable sleeve 5 and rolling elements 4.

Flexible gearwheel 6 comprises several toothed segments 7.1, 7.2 which are connected to one another by way of flexible spring segments 8. Flexible gearwheel 6 is provided with an external toothing 14 which can be made to engage with internal toothing 15 of stationary ring gear 9. In the embodiment illustrated, flexible gearwheel 6 comprises twelve toothed segments 7.1, 7.2 which are divided into six first toothed segments 7.1 and six second toothed segments 7.2. First toothed segments 7.1 each comprise a recess 17 which is configured as an end-to-end opening in the interior of respective first toothed segment 7.1. A respective bolt 12 of pin element 11 is received in each recess 17. Each bolt 12 is surrounded by a sleeve 13 so that a sliding bearing is formed. The elliptical shape of base body 3 of wave generator 2 is transferred to flexible gearwheel 6 by rolling elements 4 and deformable sleeve 5. As a result, external toothing 14 of flexible gearwheel 6 is in engagement with internal toothing 15 of ring gear 9 at two mutually oppositely disposed points.

Wave generator 2 is preferably connected to a drive shaft. A rotation of the drive shaft causes wave generator 2 to rotate. This rotary motion is transmitted to flexible gearwheel 6. External toothing 14 of flexible gearwheel 6 therefore runs along internal toothing 15 of ring gear 9. Spring segments 8 arranged between toothed segments 7.1, 7.2 enable the flexible or elastic deformation of flexible gearwheel 6. The motion of flexible gearwheel 6 is transferred via bolts 12 to a uniform rotary motion of the output.

Figure 2:
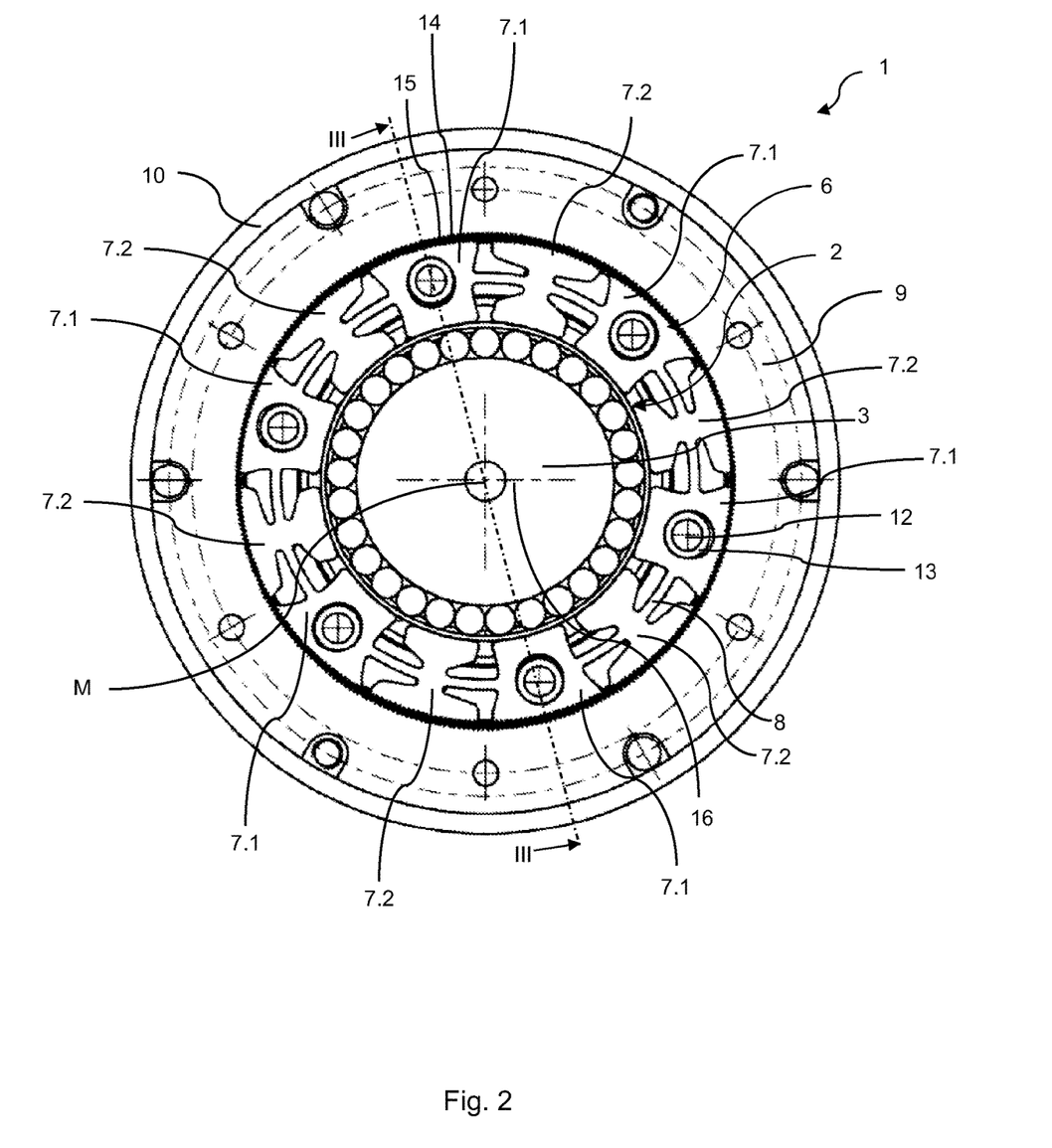
FIG. 2: shows a front view of the transmission from FIG. 1, FIG. 3: shows a cross section through the transmission from FIG. 2 along the line III-III.

In FIG. 2, transmission 1 from FIG. 1 is shown in a front view. The elliptical cross-sectional shape of wave generator 2 and of base body 3 of wave generator 2 can be clearly seen there. The center of the ellipse is always on central middle axis M of transmission 1. In the case shown, main axis 16 of elliptical base body 3 is aligned exactly horizontally. Due to the elliptical shape of wave generator 2, flexible gearwheel 6 is deformed in two regions, in the case shown in FIG. 2 on the right-hand and left-hand side of transmission 1 respectively, in such a way that external toothing 14 of flexible gearwheel 6 engages with internal toothing 15 of stationary ring gear 9. Furthermore, in the other two regions, which are shown on the upper and lower side in FIG. 2, external toothing 14 of flexible gearwheel 6 is not in engagement with internal toothing 15 of ring gear 9.

Figure 3:
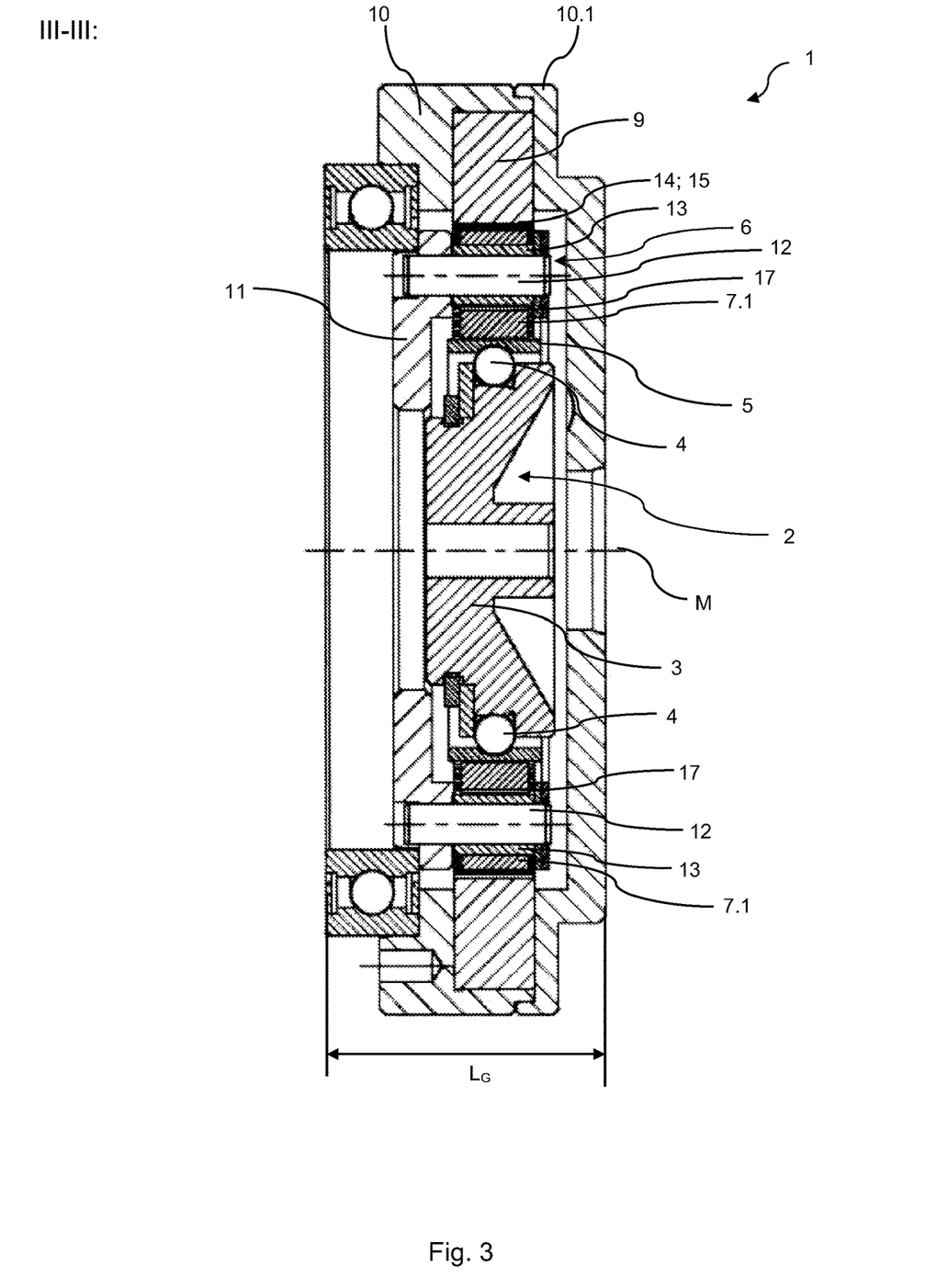

FIG. 3 shows a cross section through transmission 1 along line III-III from FIG. 2. Transmission 1 comprises housing 10 which is closed by a housing cover 10.1. Ring gear 9 is fastened in housing 10. Ring gear 9 is in engagement in sections with flexible gearwheel 6, for which purpose ring gear 9 comprises internal toothing 15 and flexible gearwheel 6 comprises external toothing 14. Flexible gearwheel 6 comprises first toothed segments 7.1. Each of first toothed segments 7.1 comprises a recess 17. One of bolts 12 is arranged in each recess 17. One of sleeves 13 can be attached to each of bolts 12 so that a sliding bearing is formed. Recesses 17 are somewhat larger than sleeves 13. In the case shown, recesses 17 have an elliptical cross section. The cross section of bolts 12 and sleeves 13 is round. The diameter of recesses 17 is slightly larger than the outer diameter of sleeves 13. Flexible gearwheel wheel 6 rests on deformable sleeve 5. Deformable sleeve 5 is connected to base body 3 by way of rolling elements 4. Base body 3, rolling elements 4, and deformable sleeve 5 form wave generator 2. As can be clearly seen in FIG. 3, transmission 1 has a very short overall length $L_G$ and is therefore very short in relation to the diameter. High torsional stiffness is nevertheless given. A transmission as described above has a high reduction ratio.

Figure 4:
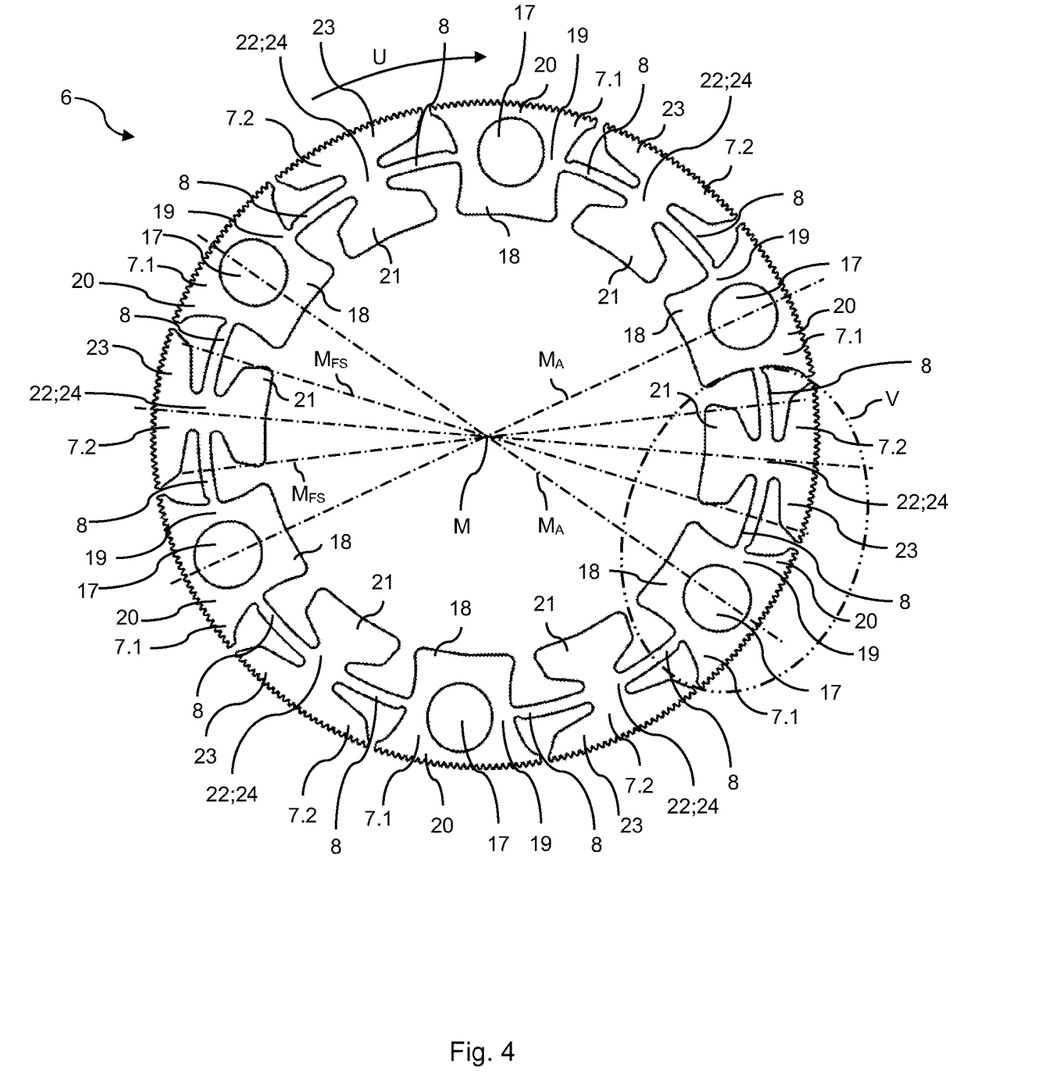
FIG. 4: shows a flexible gearwheel of the transmission from FIG. 1, FIG. 5: shows a detail of the flexible gearwheel from FIG. 4, FIG. 6: shows a view of the region of engagement between the flexible gearwheel and the ring gear of the transmission from FIG. 1, FIG. 7: shows a simplified view of the region of engagement between the flexible gearwheel and the ring gear shown in FIG. 6, and FIG. 8: shows an enlarged view of the region of engagement between the flexible gearwheel and the ring gear.

An embodiment of flexible gearwheel 6 is shown in FIG. 4. As already described, flexible gearwheel 6 comprises first and second toothed segments 7.1, 7.2 which are connected to one another by way of spring segments 8. In the embodiment illustrated, flexible gearwheel 6 comprises twelve toothed segments 7.1, 7.2. Every second of the toothed segments, i.e. first toothed segments 7.1, comprises recess 17. First toothed segments 7.1 are all configured to be identical to one another. Second toothed segments 7.2 are arranged between first toothed segments 7.1. Second toothed segments 7.2 comprise no recess. Adjacent toothed segments 7.1, 7.2 are connected to one another by way of spring segments 8. Spring segments 8 are configured as arcuate webs which extend along a circular line, the center of which in this configuration is disposed on the center axis of transmission 1.

The shape of first toothed segments 7.1 and second toothed segments 7.2 shall be described in more detail hereafter:

Each first toothed segment 7.1 comprises a foot region 18 with which it comes into contact with wave generator 2. Starting out from foot region 18, a trunk region 19 adjoins radially outwardly in which recess 17 is arranged. Recess 17 therefore has a closed contour located in the interior of toothed segment 7.1. Bolt 12 or sleeve 13, respectively, rolls along this contour. As a result, the contact of bolt 12 or sleeve 13 with recess 17 is never discontinued, whereby the running smoothness of transmission 1 is increased. A head region 20 adjoins trunk region 19 in the radial direction. External toothing 14 is formed on the outwardly facing circumferential surface of head region 20 of each first toothed segment 7.1. Since recess 17 is arranged in the interior of first toothed segment 7.1, external toothing 14 extend over the entire outwardly facing circumferential surface of first toothed segment 7.1. If the width of first toothed segment 7.1 in circumferential direction U of flexible gearwheel 6 is now examined, then first toothed segment 7.1 has a first width in foot region 18 that tapers in the trunk region and increases again towards the outside so that first toothed segment 7.1 has the greatest width at the outer circumference.

Second toothed segments 7.2 also comprise a foot region 21 which comes into contact with wave generator 2. A trunk region 22, which transitions to a head region 23, adjoins this foot region 21 in the radial direction outwardly also in the case of second toothed segments 7.2. Second toothed segments 7.2 comprise no recess. Instead, second toothed segments 7.2 are strongly constricted in trunk region 22 and therefore have a waisting 24. External toothing 14 is also formed on the outwardly facing circumferential surface of head regions 23 of second toothed segments 7.2.

Each of toothed segments 7.1, 7.2 is connected to adjacently disposed toothed segments 7.2, 7.1 by way of spring segments 8. Spring segments 8 are configured as arcuate webs which extend on a circular line in the circumferential direction of flexible gearwheel 6. Spring segments 8 engage in first toothed segments 7.1 approximately at the level of the center of recess 17. The connection between spring segments 8 and second toothed segments 7.2 is at the level of waisting 24. As can be clearly seen in FIG. 4, flexible gearwheel 6 is formed integrally.

Second toothed segments 7.2, which comprise no recess, transmit the toothing forces by way of spring elements 8 to first toothed segments 7.1 with recess 17. This allows spring segments 8 to be configured to be larger, whereby the flexibility is increased and sufficient elastic deformation can still be obtained with a smaller diameter of transmission 1. The shape of spring elements 8 illustrated ensures that they have no elasticity in the tangential direction to the extent possible, but only in the radial direction.

Each of spring segments 8 has a middle plane $M_{FS}$ which contains the central middle axis of transmission 1 and divides respective spring segment 8 into two regions of equal length. Since spring segments 8 are formed by webs in the shape of a circular arc, this length corresponds to an arc length. Each of recesses 17 also has a middle plane $M_A$ which contains the central middle axis of transmission 1 and divides respective recess 17 into two equally large regions. Spring segments 8 between toothed segments 7.1, 7.2 are configured to be asymmetrical in such a way that middle plane $M_{FS}$ of each spring segment 8 is at a different distance from the two middle planes $M_A$ of recesses 17 each respectively adjacent thereto. Middle plane $M_{FS}$ of each spring segment 8 and middle plane $M_A$ of each recess 17 intersect at central middle axis M of transmission 1. The distance between middle plane $M_{FS}$ of each spring segment and two middle planes $M_A$ each respectively disposed adjacent thereto can therefore be expressed by angles that differ in size.

Figure 5:
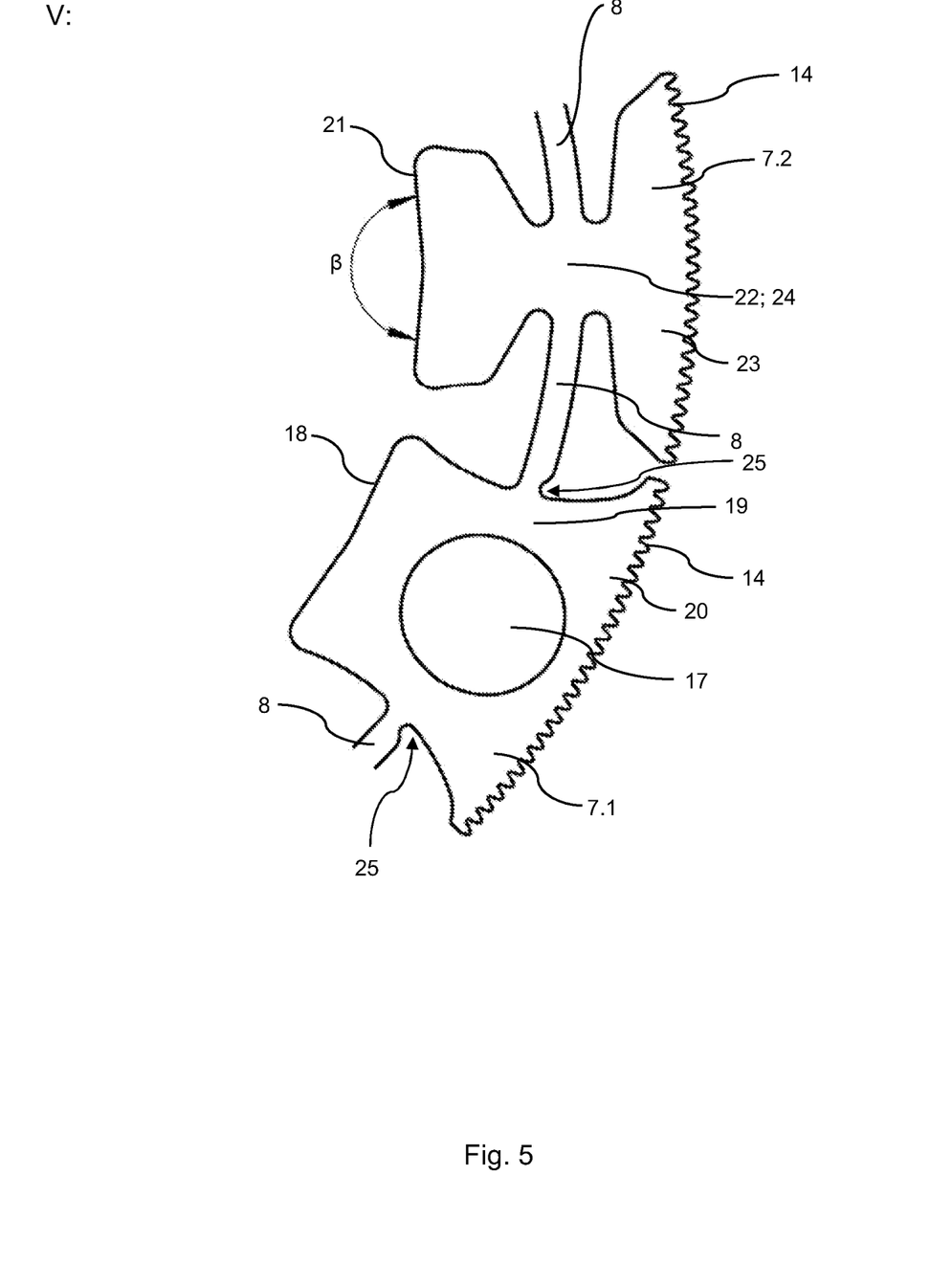

Detail V from FIG. 4 is shown enlarged in FIG. 5. A first toothed segment 7.1 and a second toothed segment 7.2 are shown. As already described, first toothed segment 7.1 comprises a foot region 18, a trunk region 19, and a head region 20. Recess 17 is located in trunk region 19 of first toothed segment 7.1. External toothing 14 is formed in head region 20. Second toothed segment 7.2 also comprises a foot region 21, a trunk region 22 comprising a waisting 24, and a head region 23. External toothing 14 is formed on the outer circumferential surface of head region 23. Foot region 21 of second toothed segment 7.2 as well as foot region 18 of first toothed segment 7.1 comprise a concave recess so that each of toothed segments 7.1, 7.2 is supported on wave generator 2 at two points of support. The alignment of toothed segments 7.1, 7.2 normal to the outer contour of wave generator 2 is thus improved. This concave depression has an opening angle β of approximately 170°.

Spring segments 8 engage in first toothed segments 7.1 approximately at the level of recesses 17. Spring segments 8 have a relief cut 25 in the region where spring segments 8 transition to first toothed segments 7.1. This relief cut 25 can increase the flexibility of flexible gearwheel 6 in the transition region from spring segments 8 to first toothed segments 7.1.

Spring segments 8 engage in second toothed segments 7.2 at the level of waisting 24. Since second toothed segments 7.2 have a very small width in this region, there is sufficient flexibility given there. Adjacently disposed toothed segments 7.1, 7.2 are arranged at a distance from one another both in the head region as well as in the foot region.

Figure 6:
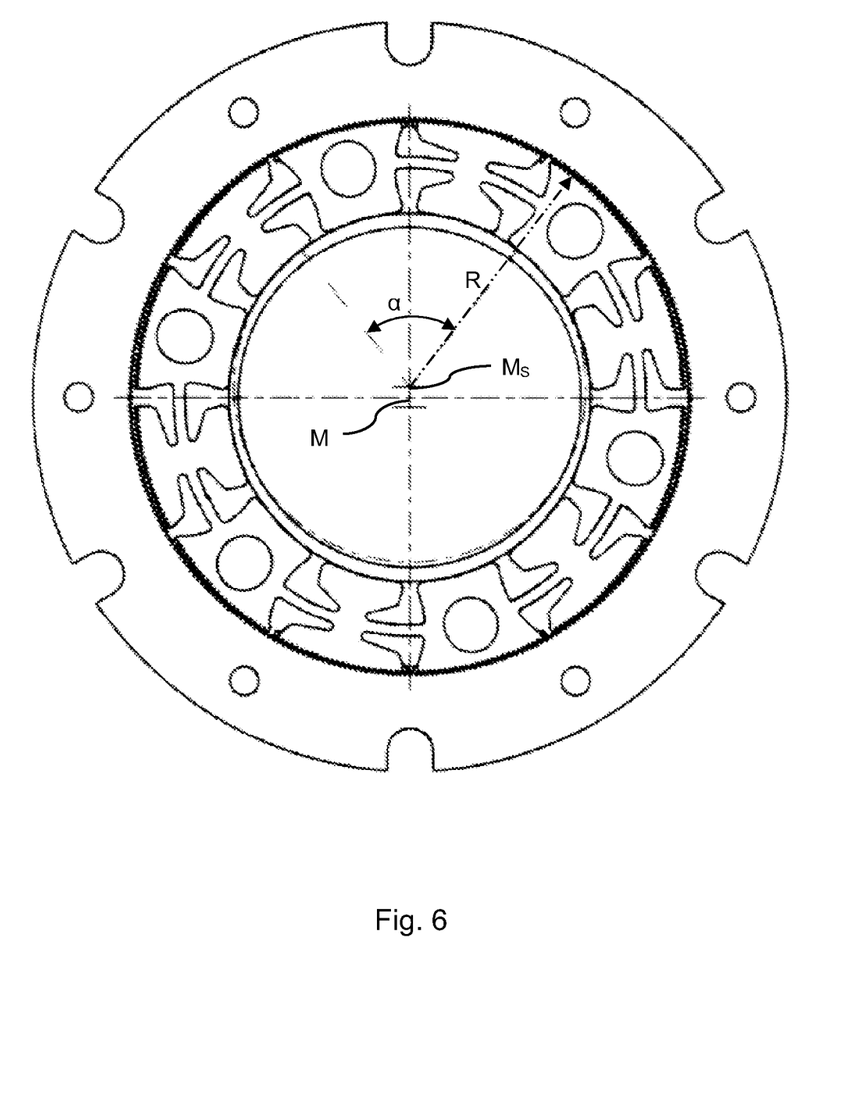
Figure 7:
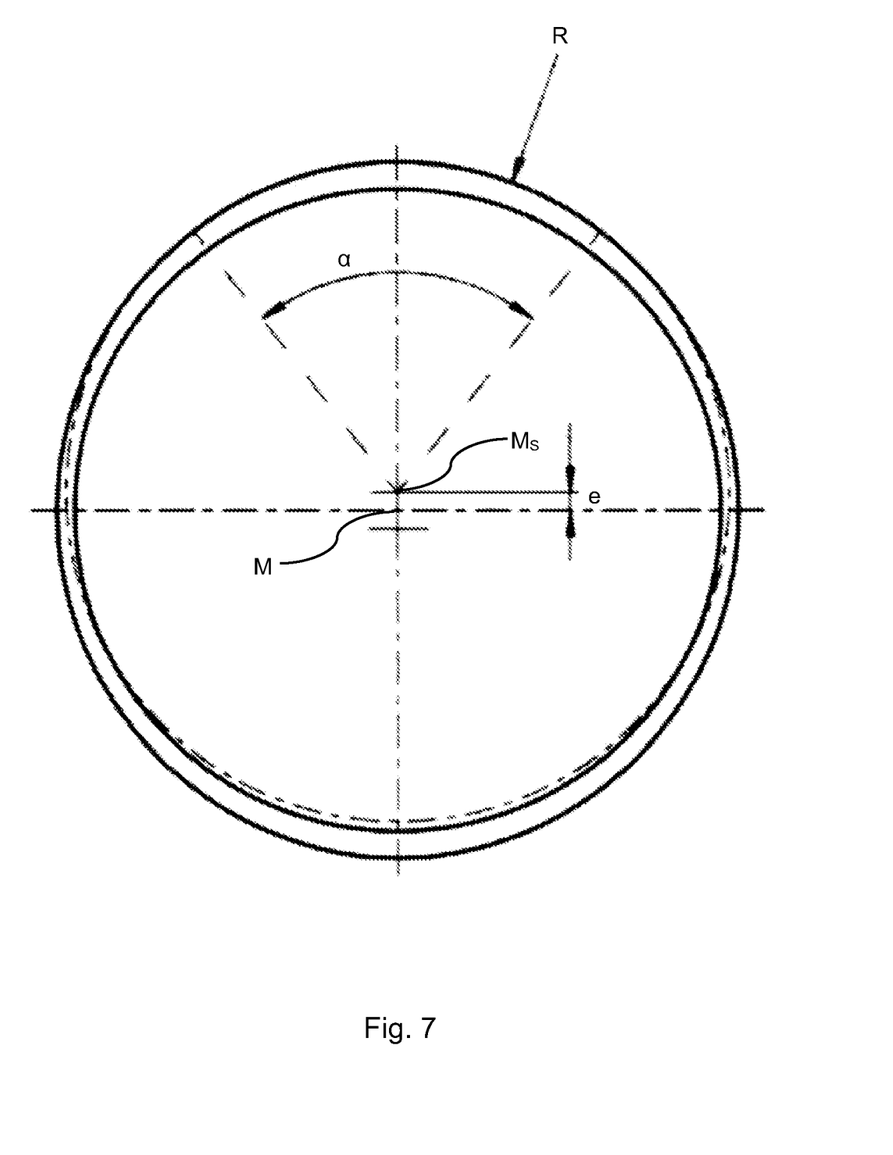
Figure 8:
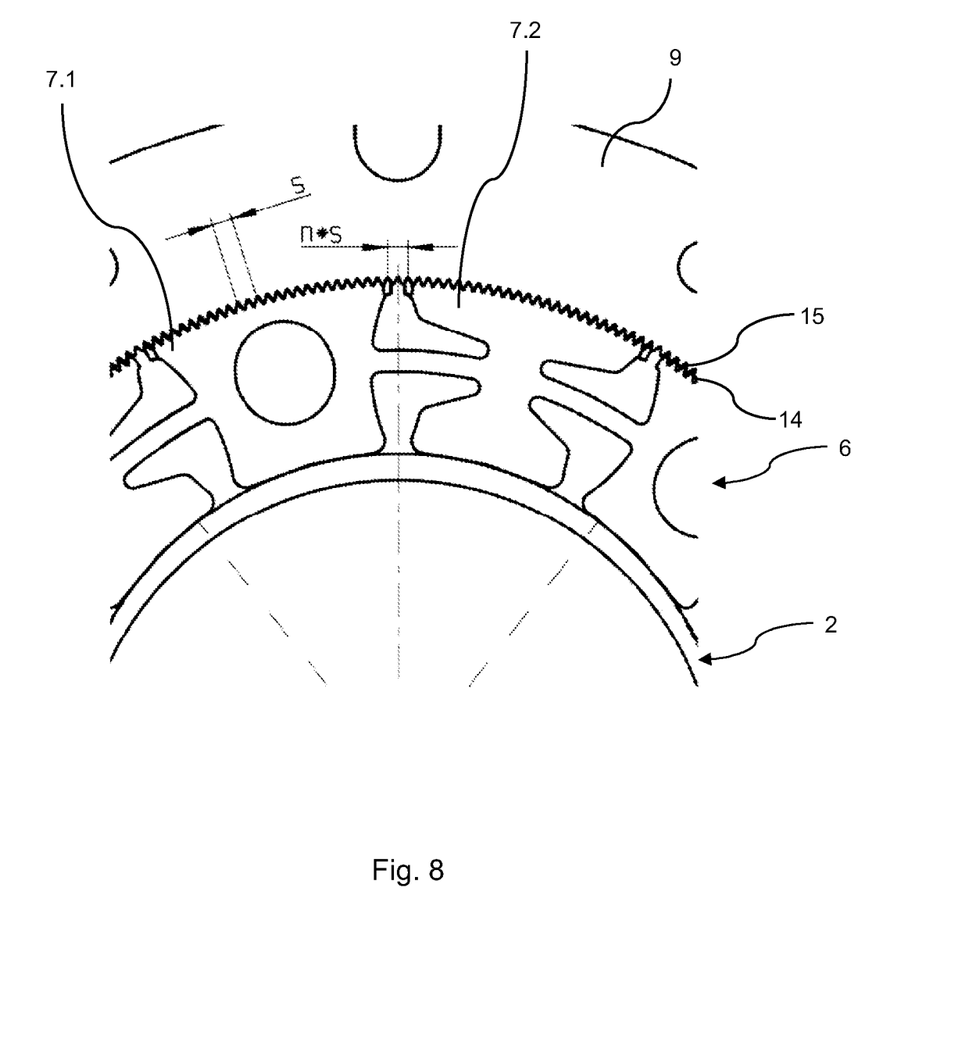

As can be seen in FIG. 5, first toothed segments 7.1 can have a different number of teeth than second toothed segments 7.2. The number of teeth of flexible gearwheel 6 is therefore no integer multiple of the number of toothed segments 7.1, 7.2. The number of toothed segments 7.1, 7.2 is therefore not determined by the number of teeth of entire flexible gearwheel 6. The number and/or the arrangement of the teeth on toothed segments 7.1, 7.2 is therefore not necessarily uniform. In order for every tooth on toothed segments 7.1, 7.2 to have the same shape, the geometry of wave generator 2, i.e. the elliptical cross-sectional shape with two oppositely disposed cams, can be selected such that a constant radius R extends in the region of the upper high point (elevation) over the angle α within which the toothed engagement takes place. In this embodiment, angle α is 72°. This is illustrated in FIGS. 6-8. All toothed segments 7.1, 7.2 located within this section, i.e. of angle α, result in an imaginary gearwheel having radius R which rotates about an axis $M_S$. This axis $M_S$ is at a certain distance e from central middle axis M of transmission 1. Distance e there has a length ratio of less than 10% to the radius of the ring gear. The only boundary condition is that the distance between the two outer teeth, which are located on adjacent transmission elements 7.1, 7.2, be an integer multiple of tooth width S within this region. Tooth width S is presently defined as twice the distance between two adjacently disposed teeth of external toothing 14. This is illustrated in FIG. 8.

The advantage of the transmission according to the invention with a high reduction ratio is that the length of the transmission is very short and the torsional rigidity is high.

LIST OF REFERENCE CHARACTERS 1 transmission
2 wave generator
3 base body
4 rolling element
5 deformable sleeve
6 flexible gearwheel
7.1 first toothed segment
7.2 second toothed segment
8 spring segments
9 ring gear
10 housing
10.1 housing cover
11 pin element
12 bolt
13 sleeve
14 external toothing
15 internal toothing
16 main axis base body
17 recess
18 foot region first toothed segment
19 trunk region first toothed segment
20 head region first toothed segment
21 foot region second toothed segment
22 trunk region second toothed segment
23 head region second toothed segment
24 waisting
25 relief cut
M central middle axis transmission
$L_G$ overall length transmission
U circumferential direction
$M_{FS}$ middle plane spring segment
$M_A$ middle plane recess
$M_S$ axis imaginary gearwheel
R radius imaginary gearwheel
e distance imaginary gearwheel
α angle
β opening angle
S tooth width

The invention claimed is:

1. Transmission comprising:
a ring gear in which one single flexible gearwheel is arranged, where said single flexible gearwheel is connected to a wave generator and said wave generator deforms said single flexible gearwheel such that it is in engagement in some regions with said ring gear, and where said flexible gearwheel includes a plurality of toothed segments which are connected to one another by way of spring segments and at least one of said toothed segments includes a recess in which a pin element is arranged; and
each of spring segments has a middle plane ($M_{FS}$) which contains a central middle axis of said transmission and divides said respective spring segment into two regions of equal size and each recess has a middle plane which includes said central middle axis of said transmission and divides said recess into two regions of equal size, and said middle plane of each spring segment is at a different distance from said middle plane of said recess disposed on each side of said middle plane ($M_{FS}$) of said spring segment, adjacent to said middle plane of said spring segment.

2. Transmission according to claim 1, wherein at least one of said plurality of toothed segments comprises:
a waisting in the radial direction of said single flexible gearwheel and said spring segments engage in said at least one toothed segment in the region of said waisting.

3. Transmission according to claim 1, wherein said spring segments are configured such that they exhibit elasticity in the radial direction and are rigid in a tangential direction.

4. Transmission according to claim 1, wherein said spring segments are formed integrally with said plurality of toothed segments.

5. Transmission according to claim 1, wherein said spring segments are formed as webs which connect adjacent toothed segments of the plurality of toothed segments to one another.

6. Transmission according to claim 1, wherein said single flexible gear wheel comprises:
at least one first toothed segment of the plurality of toothed segments which is provided with said recess; and
at least one second toothed segment of the plurality of toothed segments having no recess.

7. Transmission according to claim 6, wherein said spring segments engage in said at least one first toothed segment of the plurality of toothed segments at a level of said recesses in said at least one first toothed segment.

8. Transmission according to claim 6, wherein said spring segments have a relief cut (25) in a region where they are in contact with said at least one first toothed segment of the plurality of toothed segments.

9. Transmission according to claim 1, wherein half of said plurality of toothed segments comprise:
said recess.

10. Transmission according to claim 6, wherein said recess in said first toothed segments is arranged in an interior of said respective toothed segment.

11. Transmission according to claim 1, wherein each toothed segment is supported on said wave generator at two support points.

12. Transmission according to claim 1, wherein said wave generator comprises:
at least one cam which is in contact with said single flexible gear wheel, and said cam is configured such that said toothed segments are deformed in a region where they are in engagement with said ring gear such that they form a section of an imaginary gear wheel having a constant radius and will rotate about an axis which is at a defined distance from said central middle axis of said transmission.

13. Transmission according to claim 1, wherein each pin element is configured as a bolt which is connected to an output shaft.

14. Transmission according to claim 13, wherein a sleeve is arranged on each bolt.

15. Transmission according to claim 2, wherein said spring segments are configured such that they exhibit elasticity in the radial direction and are rigid in a tangential direction.

16. Transmission according to claim 15, wherein said spring segments are formed integrally with said plurality of toothed segments.

17. Transmission according to claim 16, wherein said spring segments are formed as webs which connect adjacent toothed segments of the plurality of toothed segments to one another.

18. Transmission according to claim 17, wherein said single flexible gear wheel comprises:
at least one first toothed segment of the plurality of toothed segments which is provided with said recess; and
at least one second toothed segment having no recess.

19. Transmission according to claim 1, wherein the plurality of toothed segments includes four toothed segments.

* * * * *